United States Patent
Kondo et al.

(10) Patent No.: US 6,408,892 B1
(45) Date of Patent: Jun. 25, 2002

(54) CAR VACUUM HOSE

(75) Inventors: Takeshi Kondo; Isamu Terasawa, both of Tokyo; Hiroshi Tanaka, Kanagawa-ken; Toshinori Ishii, Kanagawa-ken; Yoshihiro Ishii, Kanagawa-ken, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/622,064

(22) PCT Filed: Dec. 21, 1999

(86) PCT No.: PCT/JP99/07184
§ 371 (c)(1),
(2), (4) Date: Aug. 28, 2000

(87) PCT Pub. No.: WO00/40884
PCT Pub. Date: Jul. 13, 2000

(30) Foreign Application Priority Data

Dec. 28, 1998 (JP) ............................................. 10-372761

(51) Int. Cl.$^7$ ................................................ F16L 11/04

(52) U.S. Cl. ......................... 138/137; 138/140; 138/141

(58) Field of Search ................................. 138/137, 141, 138/140, 126

(56) References Cited

U.S. PATENT DOCUMENTS

| | | | | |
|---|---|---|---|---|
| 4,666,974 A | * | 5/1987 | Keskey et al. | 524/547 |
| 5,362,530 A | * | 11/1994 | Kitami et al. | 138/126 |
| 5,380,571 A | * | 1/1995 | Ozawa et al. | 138/137 |
| 5,570,711 A | * | 11/1996 | Walsh | 138/126 |
| 5,622,210 A | * | 4/1997 | Crisman et al. | 138/123 |
| 5,792,532 A | * | 8/1998 | Pfleger | 138/137 |
| 5,891,943 A | * | 4/1999 | Katsumata et al. | 524/310 |
| 5,957,164 A | * | 9/1999 | Campbell | 138/137 |
| 6,179,008 B1 | * | 1/2001 | Kawazura et al. | 138/137 |

* cited by examiner

Primary Examiner—James Hook
(74) Attorney, Agent, or Firm—Rader, Fishman & Grauer, PLLC

(57) ABSTRACT

There is disclosed a hose comprising an inner layer as an inside layer and an outer layer disposed on an outer peripheral surface of the inner layer, in which an olefin thermoplastic elastomer comprising polypropylene (PP) and acrylonitrile-butadiene rubber (NBR) is used in the inner layer, and an olefin thermoplastic elastomer comprising polypropylele (PP) and ethylene-propylene-diene rubber (EPDM) is used in the outer layer to perform molding. A stabilizer comprising amines or a mixture of thioethers and hindered phenols is preferably added as a stabilizer to the olefin thermoplastic elastomer forming the inner layer. The amount of added stabilizer is set to 1 to 5 wt%. Moreover, the hardness of the olefin thermoplastic elastomer is preferably set to 60 to 90 in JIS A hardness.

6 Claims, 2 Drawing Sheets

CAR VACUUM HOSE

TECHNICAL FIELD

The present invention relates to hoses, particularly to car hoses, for example, car hoses for use as a positive crank case ventilation hose, a vacuum regulator valve hose, a cruise control vacuum hose and a brake vacuum hose, wherein the hose is manufactured by extrusion molding without vulcanizing.

BACKGROUND ART

For a conventional vacuum hose used for cars, generally, a two-layer structured hose is used in which epichlorohydrin rubber (ECO) superior in heat resistance and oil resistance, acrylonitrile-butadiene rubber (NBR) or the like is used in an inner layer, and chlorosulfonated polyethylene (CSM) superior in wear resistance is used in an outer layer. Since these rubber hoses are heavy, and a rubber kneading process and a vulcanizing process are necessary, a manufacture process is complicated and it is difficult to reduce costs. Moreover, since different materials forming the two-layer structure cannot be separated, they cannot be recycled or used.

In recent years, from requests for the saving of resources and the lightening of cars, instead of the rubber hoses, for example, resin hoses have been used in which nylon (PA)6, or nylon (PA)12 is used in sensing hoses, and the like. The conventional resin hose is molded by extruding one type of resin into one layer.

However, although the conventional resin hose is of one type of material, and can be recycled, its flexibility is insufficient, and the hose cannot directly be inserted or attached to an opponent component like the rubber hose. Moreover, not only the resin hose is inferior in inserting property as described above, but also the resin hose has to use a quick connector (O ring seal) or a seal agent to secure the sealing property equal to that of the rubber hose. Another problem is that the conventional resin hose is inferior to the rubber hose in flexibility and vibration absorption.

This invention has been developed in consideration of the above-described present situation, and an object thereof is to provide the following hose.

Specifically, an object of the present invention is to provide a hose which is superior in flexibility and vibration absorption, which can directly be inserted and attached to the opponent component, and which can secure a sealing property.

Moreover, an object of the present invention is to provide a hose which intends to be reduced in weight and cost.

Furthermore, an object of the present invention is to provide a recyclable hose.

DISCLOSURE OF THE INVENTION

According to the present invention, there is provided a hose which comprises an inner layer as an inside layer and an outer layer disposed on the outer peripheral surface of the inner layer. An olefin thermoplastic elastomer comprising polypropylene (PP) and acrylonitrile-butadiene rubber (NBR) is used in the inner layer, and an olefin thermoplastic elastomer comprising polypropylele (PP) and ethylene-propylene-diene rubber (EPDM) is used in the outer layer to perform molding.

By forming the inner and outer layers by the above-described materials, a hose superior in oil resistance, fuel oil resistance, and heat resistance can be obtained, and additionally by employing a low specific-weight material, lightening can be realized. Moreover, since the whole is of the same olefin thermoplastic elastomer, the vulcanizing process is unnecessary, and the manufacture can be performed only by extrusion molding. Therefore, since the reduction of the manufacture processes lowers the processing cost, the cost of the product can be reduced. Moreover, since the whole is formed of a thermoplastic resin, not by combining the thermoplastic resin and rubber as in the conventional art, the product is subjected to a thermal processing (post-processing) so that the configuration of the product can freely be changed (bend processing). Furthermore, since the whole is constituted of the thermoplastic material, it can be recycled, and reused as the resin material by melting or pelletizing the product.

Moreover, it is preferable to add an amine stabilizer, or a stabilizer formed of a mixture of thioether and hindered phenol to the olefin thermoplastic elastomer. The addition of the stabilizer can further enhance the heat resistance. The stabilizer is preferable in a range of 1 to 5 wt %. If it is 1 wt % or less, it does not act as the stabilizer, and if it is 5 wt % or more, kneading and mixing are difficult, and the stabilizer is possibly deposited on the surface. Moreover, the hardness of the olefin thermoplastic elastomer is preferably in a range of 60 to 90 in JIS A hardness. By setting the hardness to 60 to 90 in JIS A hardness, the hose inserting property, and hose extracting pressure can be enhanced.

BEST MODE FOR CARRYING OUT THE INVENTION

To describe a hose of the present invention in more detail, concrete embodiments will be described hereinafter in detail.

Figure 1:
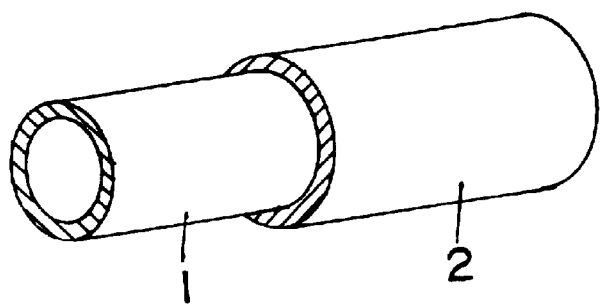
FIG. 1 is a partially cut-away perspective view of a thermoplastic elastomer hose according to the present invention.

As shown in FIG. 1, in an embodiment, an olefin thermoplastic elastomer comprising polypropylene (PP) and acrylonitrile-butadiene rubber (NBR) is used in an inner layer 1 as an inside layer, and an olefin thermoplastic elastomer comprising polypropylele (PP) and ethylene-propylene-diene rubber (EPDM) is used in an outer layer 2 to perform molding, which results from the following embodiment. Among the thermoplastic elastomers, the thermoplastic elastomer which can be used under an environmental condition for use as a car vacuum hose was tested as follows. A material was first tested.

A test method was performed as follows. For normal physical properties, the hardness, tensile strength and elongation were measured according to a method of "JIS K6301 (vulcanized rubber physical test method) tensile, hardness test". Moreover, for the heat resistance, according to a method of "JIS K6301 (vulcanized rubber physical test method) aging test", the material was accelerated in deterioration by an air heating aging test of 120° C.×168 h, taken out of a test tank and left to cool down to a room temperature. Thereafter, the hardness, tensile strength and elongation were measured. Furthermore, for the oil resistance, according to a method of "JIS K6301 (vulcanized rubber physical test method) immersion test", a test piece was immersed in IRM903 and accelerated in deterioration by an immersion heating test of 120° C.×70 h. Thereafter, the volume change ratio was measured.

Moreover, for the fuel oil resistance, according to the method of "JIS K6301 (vulcanized rubber physical test method) immersion test", the test piece was immersed in a test solution obtained by mixing 50 vol % of isooctane and 50 vol % of toluene at the room temperature for 70 hours and accelerated in deterioration. Thereafter, the volume change ratio was measured. Additionally, for the ozone resistance, according to a method of "JIS K6301 (vulcanized rubber physical test method) ozone deterioration test", the test piece was elongated by 20% and accelerated in deterioration by an ozone aging test with an ozone concentration of 50 pphm at a room temperature of 40° C. for 250 hours. Thereafter, the test piece was taken out of the test tank, its visual appearance was observed, and the presence/absence of cracks, or breakage was measured.

Additionally, in the material constitution, in Example 1, "Santoprene 101-64", manufacture by AES Co. was used as the olefin thermoplastic elastomer comprising polypropylene (PP) and ethylene-propylene-diene rubber (EPDM). In Example 2, "Geolast 701-70", manufactured by AES Co. was used as the olefin thermoplastic elastomer comprising polypropylene (PP) and acrylonitrile-butadiene rubber (NBR).

On the other hand, in Comparative Example 1, "LCS D-2620" manufactured by Denki Kagaku Kogyo K.K. was used as a polyvinyl chloride elastomer comprising polyvinyl chloride resin (PVC) and acrylonitrile-butadiene rubber (NBR). In Comparative Example 2, "S-TPAE A60" manufactured by Sekisui Chemical Co., Ltd. was used as an amide elastomer comprising polyamide (PA) and polyethylene terephthalate (PET). Moreover, in Comparative Example 3 as rubber, acrylonitrile-butadiene rubber (NBR) heretofore used was used, and in Comparative Example 4 epichlorohydrin rubber (ECO) heretofore used was similarly used.

Test results are as shown in Table 1.

TABLE 1

| Item | | Example 1 | Example 2 | Comparative example 1 | Comparative example 2 | Comparative example 3 | Comparative example 4 |
| --- | --- | --- | --- | --- | --- | --- | --- |
| Material | Classification | Olefin | Olefin | Polyvinyl chloride | Amide | — | — |
| | Material Constitution | PP/EPDM | PP/NBR | PVC/NBR | PA/PET | NBR | ECO |
| Normal physical properties | Hardness (JISA) | 68 | 74 | 72 | 68 | 70 | 68 |
| | Tensile strength (MPa) | 5.0 | 5.1 | 14.4 | 26.8 | 15.8 | 10.3 |
| | Elongation (%) | 310 | 220 | 380 | 920 | 540 | 450 |
| Heat resistance | Hardness change (point) | +1 | ±0 | +18 | −8 | +14 | +5 |
| | Tensile strength change (%) | ±0 | ±0 | −44 | −32 | +4 | +12 |
| | Elongation change (%) | −7 | −23 | −97 | +13 | −65 | −45 |
| Oil resistance | Volume change ratio (%) | +92 | −1 | −4 | +9 | +8 | −3 |
| Fuel oil resistance | Volume change ratio (%) | +85 | +36 | +49 | +56 | +24 | +29 |
| Ozone resistance | | No trouble | No trouble | No trouble | No trouble | Crack generated | No trouble |

The test results show that the olefin thermoplastic elastomers shown in the examples are superior in heat resistance because crosslinking is completed by dynamic vulcanization. The olefin thermoplastic elastomer is generally constituted of polyethylene (PE) or polypropylene (PP) and ethylene-propylene rubber (e.g., EPDM, EPM, EBM). Since these materials are inferior in oil resistance and fuel oil resistance, they can be applied to the cover materials to which oil or fuel does not directly stick, but cannot be used as the inner-layer materials. However, since Example 2 is constituted of the olefin thermoplastic elastomer of polypropylene (PP) and acrylonitrile-butadiene rubber (NBR), the oil resistance and fuel oil resistance are enhanced, and it can be found that the example is suitable as the inner-layer material.

Subsequently, the hose was prepared using the olefin thermoplastic elastomer based on the above-described test results, and subjected to various tests as the vacuum hose. In Examples 3 and 4, the olefin thermoplastic elastomer comprising polypropylene (PP) and acrylonitrile-butadiene rubber (NBR) was used in the inner layer, and the olefin thermoplastic elastomer comprising polypropylele (PP) and ethylene-propylene-diene rubber (EPDM) was used in the outer layer to perform the molding. The hardness of the inner layer was set to 74 in Example 3, and 84 in Example 4 in JIS A hardness. Additionally, the inner diameter of the hose was set to about 3.0 mm, the outer diameter thereof was set to about 7.0 mm, and the thickness of the inner layer was formed to be substantially the same as that of the outer layer in the two-layer structure.

The test method was performed as follows:

For heat resistance, both ends of a test-piece hose cut in a length of about 150 mm were sealed and deterioration was accelerated by the air heating aging test of 120° C.×300 h. Subsequently, after the test piece was left to stand at the room temperature for three hours or more, the test piece was manually stretched, or bent by 180 degrees, and the presence/absence of tear, crack or breakage was confirmed.

Moreover, for cold resistance, after the test-piece hose cut in the length of about 150 mm was left to stand in −40° C. for five hours, the hose was bent by 180 degrees along a mandrel having an outer diameter ten times as large as that of the hose, and the presence/absence of cracks and breakage was confirmed. For pressure resistance, one end of the test-piece hose cut in the length of about 150 mm was sealed, the hose was pressurized to $14.71 \times 10^{-2}$ MPa from the other end thereof by $N_2$ gas, and held for five minutes, and the outer diameter change ratio was obtained.

For negative pressure resistance, one end of the test-piece hose cut in the length of about 150 mm was sealed, a negative pressure was applied to −79.99 kPa from the other end of the hose, the hose was held for five minutes, and then the outer diameter change ratio was obtained.

Moreover, for the hose inserting property, the maximum load applied during insertion of the hose by about 20 mm to a pipe for use in an actual car (outer diameter of 4.0 mm) was measured. Furthermore, for the hose extracting property, measured was the maximum load applied when the hose was inserted by about 20 mm and extracted from the pipe for use in the actual car (outer diameter of 4.0 mm). Additionally, for the hose weight, the hose weight of the above-described test piece was measured and the weight per 1 m was obtained.

Test results are shown in Table 2.

The test results show that Examples 3, 4 have sufficient performances as the car vacuum hoses, and are reduced in weight as compared with Comparative Examples 7, 8. Moreover, these examples are superior in the hose inserting and extracting properties, and the hoses can directly be connected to the opponent components for use in the same manner as in Comparative Examples 7, 8 without using any special method. Furthermore, it is found that the hose inserting and extracting properties are enhanced as the car vacuum hoses as compared with the single-layer constitutions of Comparative Examples 5, 6. Furthermore, in Examples 3, 4, since the hose was constituted of the same thermoplastic elastomer of polypropylene, it can be recycled.

Furthermore, the hose heat resistance was tested in detail by changing the temperature and time. The test-piece hose cut in the length of about 150 mm was sealed, and deterioration was accelerated by the air heating aging test under various conditions. Thereafter, after the test piece was left to stand in the room temperature for three hours or more, the test piece was manually stretched, or bent by 180 degrees, and the presence/absence of tear, crack, and breakage was confirmed. The reason why both ends of the test piece were sealed is that both ends are inserted to a nipple and used under actual car operation conditions and evaluation is therefore performed under the conditions close to those for practical use. Test results are shown in Table 3.

TABLE 2

| Item | | Example 3 | Example 4 | Comparative example 5 | Comparative example 6 | Comparative example 7 | Comparative example 8 |
|---|---|---|---|---|---|---|---|
| Hose constitution | Inner-layer material (hardness:thickness) | PP/NBR Hs 74:1.0 t | PP/NBR Hs 84:1.0 t | PP/NBR Hs 74:2.0 t | PP/NBR Hs 84:2.0 t | NBR Hs 70:1.6 t | ECO Hs 68:1.6 t |
| | Cover material (hardness:thickness) | PP/EPDM Hs 68:1.0 t | PP/EPDM Hs 68:1.0 t | — | — | CSM Hs 60:0.4 t | CSM Hs 84:0.4 t |
| Hose heat resistance | | No trouble | No trouble | No trouble | No trouble | No trouble | No trouble |
| Hose cold resistance | | No trouble | No trouble | No trouble | No trouble | No trouble | No trouble |
| Pressure resistance (outer diameter change ratio %) | | +2.5 | +0.4 | +1.9 | +0.6 | −2.0 | +2.4 |
| Negative pressure resistance (outer diameter change ratio %) | | −1.2 | −0.6 | −0.8 | −0.2 | −0.8 | −0.9 |
| Hose inserting property (N) | | 69 | 80 | 82 | 102 | 85 | 59 |
| Hose extracting property (N) | | 52 | 75 | 38 | 50 | 105 | 25 |
| Hose weight (g/m) | | 31 | 31 | 28 | 31 | 44 | 53 |

TABLE 3

| Item | | Example 3 | Example 4 | Comparative example 5 | Comparative example 6 | Comparative example 7 | Comparative example 8 |
|---|---|---|---|---|---|---|---|
| Hose constitution | Inner-layer material (hardness:thickness) | PP/NBR Hs 74:1.0 t | PP/NBR Hs 84:1.0 t | PP/NBR Hs 74:2.0 t | PP/NBR Hs 84:2.0 t | NBR Hs 70:1.6 t | ECO Hs 68:1.6 t |
| | Cover material (hardness:thickness) | PP/EPDM Hs 68:1.0 t | PP/EPDM Hs 68:1.0 t | — | — | CSM Hs 60:0.4 t | CSM Hs 84:0.4 t |

TABLE 3-continued

| Item | | | Example 3 | Example 4 | Comparative example 5 | Comparative example 6 | Comparative example 7 | Comparative example 8 |
|---|---|---|---|---|---|---|---|---|
| Hose heat resistance | 120° C. | 300 h | o | o | o | o | o | o |
| | | 500 h | o | o | o | o | X | o |
| | 150° C. | 100 h | o | o | o | o | o | o |
| | | 200 h | o | o | X | X | X | o |
| | 160° C. | 50 h | o | o | o | o | o | o |
| | | 100 h | o | o | X | X | X | o | o: no trouble
X: with trouble

It is found from the test results that the present hose has an equal or higher heat resistance as the car vacuum hose as compared with the comparative examples, or that by disposing the outer layer, the heat resistance is further enhanced as compared with Comparative Examples 5, 6 formed of the single layer. Additionally, the heat resistance is enhanced in a wide temperature range, and the reliability as the hose is improved.

For the hose inserting and extracting properties, the relation with JIS A hardness was measured by changing the conditions in the same manner as for the above-described heat resistance. For the hose inserting property, the maximum load applied during the insertion of the hose by about 20 mm to the pipe (outer diameter of about 4.0 mm) for use in the actual car was measured. Additionally, the used pipes both with a bulge (outer diameter of about 5.0 mm) and without any bulge were measured. Moreover, for the hose extracting property, when the hose was inserted by about 20 mm to the pipe (outer diameter of 4.0 mm) for use in the actual car, pressurized by $N_2$ gas, and extracted from the pipe, the pressure was measured. Additionally, the pipe with a lower extracting pressure and with no bulge was used, and the measurement atmosphere was in 25° C. and 120° C.

Figure 2:
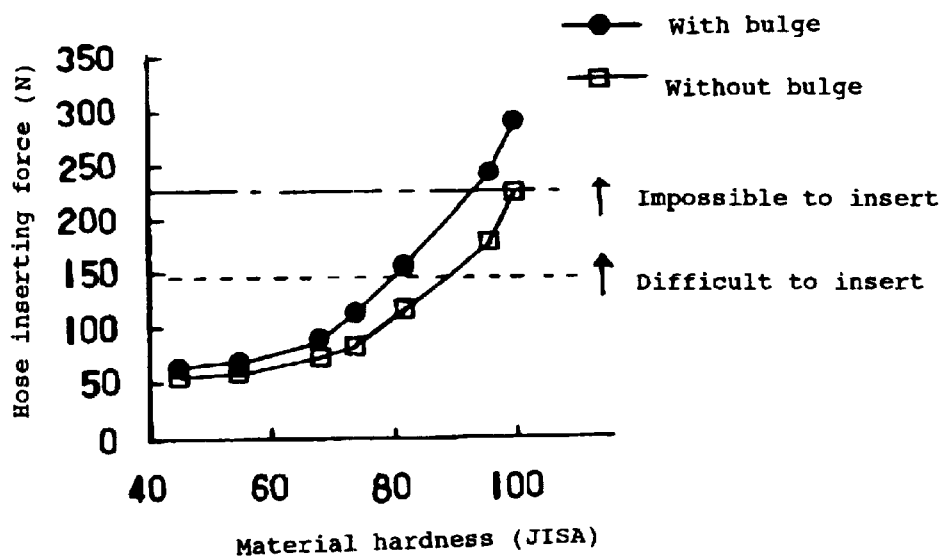
FIG. 2 is a graph of a test result showing a hose inserting property.
Figure 3:
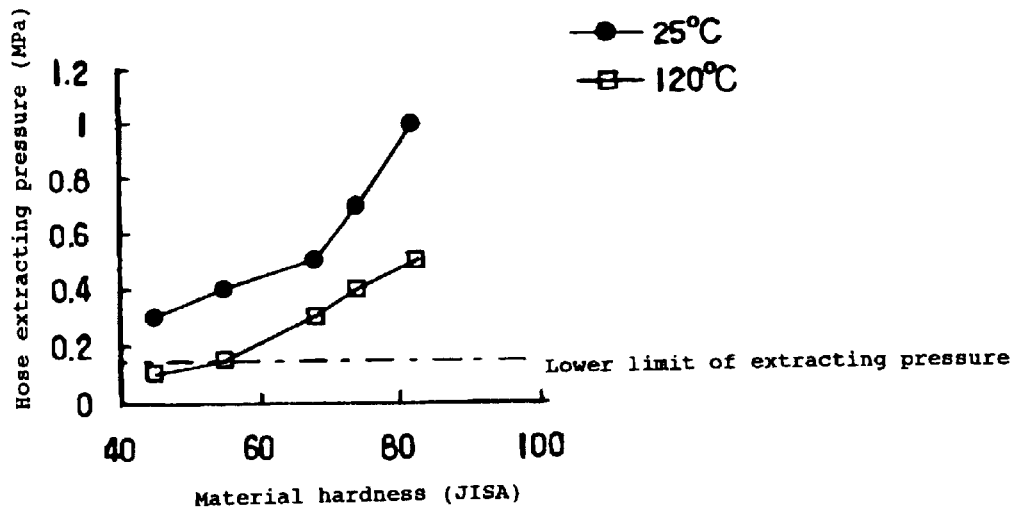
FIG. 3 is a graph of a test result showing a hose extracting pressure.

Measurement results are shown in FIG. 2 and Table 4, and FIG. 3 and Table 5. Numeric values of FIG. 2 are shown in Table 4, and numeric values of FIG. 3 are shown in Table 5.

TABLE 4

| Material hardness Measurement pipe | 45 | 55 | 68 | 74 | 82 | 96 | 100 |
|---|---|---|---|---|---|---|---|
| With bulge | 64 | 69 | 88 | 112 | 157 | 245 | 294 |
| Without bulge | 56 | 59 | 75 | 82 | 118 | 181 | 226 |

Unit: N

TABLE 5

| Material hardness Measurement temperature | 45 | 55 | 68 | 74 | 82 |
|---|---|---|---|---|---|
| 25° C. | 0.294 | 0.392 | 0.490 | 0.686 | 0.981 |
| 120° C. | 0.098 | 0.147 | 0.294 | 0.392 | 0.490 |

Unit: MPa

As shown in the above-described figures and tables, the hose inserting property is deteriorated with a higher material hardness. Furthermore, when the inserting force exceeds 150 N, it becomes difficult to insert the hose, and when it exceeds 226 N, it becomes impossible to insert the hose. Moreover, for the hose extracting property, the hose extracting pressure becomes smaller with a lower material hardness, and when the extracting pressure is 0.147 MPa or less, it becomes remarkably easy to extract the hose, and the reliability is deteriorated.

From the above-described results, when the material hardness is in a range of 60 to 90, preferably 60 to 80 in JIS A hardness, the inserting property is enhanced, the hose can directly be connected to the pipe, and the hose is also superior in extracting property. Additionally, for the material hardness, all the materials constituting the hose may be placed in the above-described range, but the apparent hardness obtained by combining the materials different in hardness may be placed in the above-described range.

Moreover, from the above-described results, the present hose is useful not only as the vacuum hose but also as a low-pressure hose for various industrial machines.

Furthermore, assuming that the heat resistance was further enhanced when various stabilizers were added to the olefin thermoplastic elastomer for use in the inner layer of the hose, comprising the polypropylene (PP) and acrylonitrile-butadiene rubber (NBR), the following test was performed.

First, the olefin thermoplastic elastomer comprising polypropylene (PP) and acrylonitrile-butadiene rubber (NBR) with various stabilizers added thereto is extruded by a biaxial resin extruder to mold a pellet again. Additionally, for the material, "Geolast 701-70" manufactured by AES Co. was used as the olefin thermoplastic elastomer comprising polypropylene (PP) and acrylonitrile-butadiene rubber (NBR). Moreover, as shown in Table 6, for the stabilizer, "NAUGARD 445" manufactured by Shiraishi Calcium Co. was used as an amine stabilizer in Example 5, and "SEENOX 1479S" manufactured by Shiraishi Calcium Co. was used as a stabilizer of a mixture of thioether and hindered phenol in Example 6. In Comparative Example 9, only the olefin thermoplastic elastomer was used without adding any stabilizer.

TABLE 6

| Blend | Example 5 | Example 6 | Comparative Example 9 |
|---|---|---|---|
| PP/NBR | 100 | 100 | 100 |
| Stabilizer A | 3 | — | — |
| Stabilizer B | — | 2 | — |

PP/NBR: Geolast 701-70 (manufactured by AES)

Subsequently, these pellets were injection molded by an injection molder to form a 3 mm thick sheet. Thereafter, a dumbbell-shaped No. 3 test piece was prepared according to JIS K6301 (vulcanized rubber physical test method) 3.2 test piece method. The test piece was accelerated in deterioration by the air heating aging test according to JIS K6301 (vulcanized rubber physical test method) heat aging test method. Subsequently, the temperature was set to 160° C., and the hardness change, tensile strength change, elongation change and presence/absence of cracks generated when the test piece was bent by 180 degrees were confirmed as the heat resistance with the elapse of time.

Figure 4:
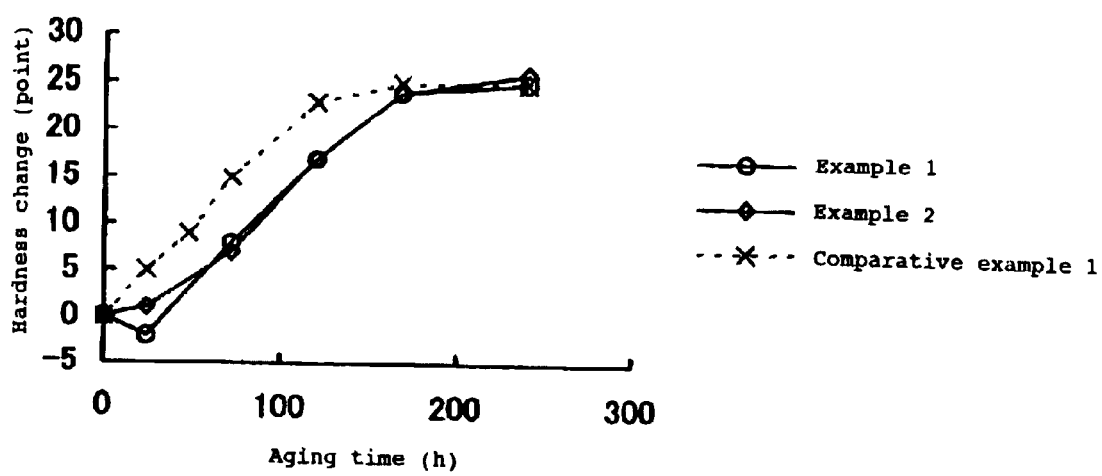
FIG. 4 is a graph showing a change in hardness when a stabilizer is added.
Figure 5:
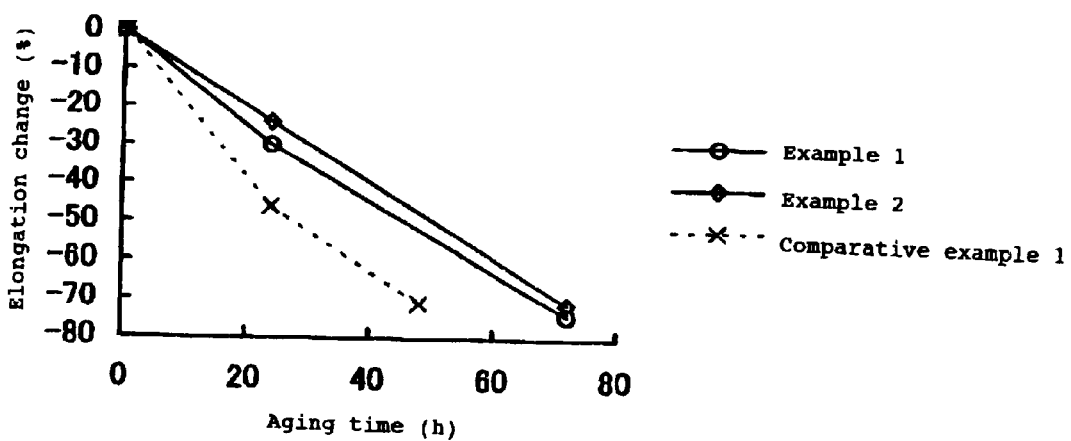
FIG. 5 is a graph showing a change in elongation when the stabilizer is added.

Various test results are shown in Tables 7 to 10. Table 7 shows the hardness change with the elapse of time, Table 8 shows the tensile strength change with the elapse of time, Table 9 shows the elongation change with the elapse of time, and Table 10 shows the result of material bending test with the elapse of time. Additionally, FIG. 4 shows Table 7 in a graph, and FIG. 5 shows Table 9 in a graph.

TABLE 7

|  | Example 5 | Example 6 | Comparative Example 9 |
|---|---|---|---|
| Initial | (73) | (72) | (72) |
| 24 h | −2(71) | +1(73) | +5(77) |
| 48 h | — | — | −9(81) |
| 72 h | +8(81) | +7(79) | +15(87) |
| 120 h | +17(90) | +17(89) | +23(95) |
| 168 h | +24(97) | +24(96) | +25(97) |
| 240 h | +25(98) | +26(98) | +25(97) |

(point)

TABLE 8

|  | Example 5 | Example 6 | Comparative Example 9 |
|---|---|---|---|
| Initial | (4.5) | (4.2) | (5.2) |
| 24 h | −4(4.3) | +5(4.4) | −12(4.6) |
| 48 h | — | — | −24(3.7) |
| 72 h | −13(3.9) | −7(3.9) | — |
| 120 h | — | — | — |

TABLE 8-continued

|  | Example 5 | Example 6 | Comparative Example 9 |
|---|---|---|---|
| 168 h | — | — | — |
| 240 h | — | — | — |

(%)

TABLE 9

|  | Example 5 | Example 6 | Comparative Example 9 |
|---|---|---|---|
| Initial | (230) | (210) | (240) |
| 24 h | −30(160) | −24(160) | −46(130) |
| 48 h | — | — | −71(70) |
| 72 h | −74(60) | −71(60) | — |
| 120 h | — | — | — |
| 168 h | — | — | — |
| 240 h | — | — | — |

(%)

TABLE 10

|  | Example 5 | Example 6 | Comparative Example 9 |
|---|---|---|---|
| 24 h | o | o | o |
| 48 h | o | o | o |
| 72 h | o | o | x |
| 120 h | x | x | x |
| 168 h | x | x | x |
| 240 h | x | x | x | o: no trouble  x: with trouble

From the above-described test results, when the amine stabilizer, or the stabilizer of the mixture of thioether and hindered phenol was added to the olefin thermoplastic elastomer comprising polypropylene (PP) and acrylonitrile-butadiene rubber (NBR), as shown in Table 10, no trouble occurred for 48 hours in Comparative Example 9, but no trouble occurred for 72 hours in Example 6, and it is therefore found that the heat resistance is enhanced by about 50%.

Subsequently, the material evaluated based on the above-described test results was used to prepare the hose on trial, and the heat resistance was evaluated on the hose. The test method first comprises subjecting the test-piece hose cut in the length of about 150 mm to the accelerated deterioration by the air heating aging test under various conditions. The method then comprises leaving these test hoses to stand in the room temperature for three hours or more, manually stretching or bending by 180 degrees the test pieces, and confirming the presence/absence of tear, crack or breakage. Test results are shown in Table 11.

TABLE 11

| Item | | Example 7 | Example 8 | Comparative Example 10 |
|---|---|---|---|---|
| Hose constitution | Inner-layer material (thickness) | PP/NBR/Stabilizer A Hs 73:1.0 t | PP/NBR/Stabilizer B Hs 72:1.0 t | PP/NBR Hs 74:1.0 t |
| | Cover material (thickness) | PP/EPDM Hs 68:1.0 t | PP/EPDM Hs 68:1.0 t | PP/EPDM Hs 68:1.0 t |

TABLE 11-continued

| Item | | | Example 7 | Example 8 | Comparative Example 10 |
|---|---|---|---|---|---|
| Hose heat resistance | 120° C. | 500 h | ○ | ○ | ○ |
| | | 750 h | ○ | ○ | X |
| | 140° C. | 150 h | ○ | ○ | ○ |
| | | 200 h | ○ | ○ | X |
| | 160° C. | 50 h | ○ | ○ | ○ |
| | | 75 h | ○ | ○ | X |

○: no trouble
X: with trouble

From the above-described test results, when the amine stabilizer, or the stabilizer of the mixture of thioether and hindered phenol was added to the olefin thermoplastic elastomer comprising polypropylene (PP) and acrylonitrile-butadiene rubber (NBR), the heat resistance can further be enhanced as the hose, and a request for further heat resistance can be satisfied.

Possibility of Industrial Utilization

As described above, the hose of the present invention is suitable for extensive use as the car vacuum hose, such as the positive crank case ventilation hose, the vacuum regulator valve hose, the cruise control vacuum hose, and the brake vacuum hose.

What is claimed is:

1. A car hose comprising an inner layer as an inside layer and an outer layer disposed on an outer peripheral surface of the inner layer, wherein an olefin thermoplastic elastomer comprising polypropylene (PP) and acrylonitrile-butadiene rubber (NBR) is used in the inner layer, and an olefin thermoplastic elastomer comprising polypropylene (PP) and ethylene-propylene-diene rubber (EPDM) is used in the outer layer wherein the hose is manufactured by extrusion molding without vulcanizing.

2. The car hose according to claim 1 wherein a stabilizer is added to said olefin thermoplastic elastomer.

3. The car hose according to claim 2 wherein the stabilizer to be added to said olefin thermoplastic elastomer is an amine stabilizer.

4. The car hose according to claim 2 wherein the stabilizer to be added to said olefin thermoplastic elastomer is a stabilizer comprising a mixture of thioether and hindered phenol.

5. The car hose according to any one of claims 2 to 4 wherein the stabilizer to be added to said olefin thermoplastic elastomer is in a range of 1 to 5% by weight.

6. The car hose according to any one of claims 1 to 4 wherein a hardness of said olefin thermoplastic elastomer is in a range of 60 to 90 in JIS A hardness.

* * * * *

UNITED STATES PATENT AND TRADEMARK OFFICE
CERTIFICATE OF CORRECTION

PATENT NO. : 6,408,892 B1
DATED : June 25, 2002
INVENTOR(S) : Kondo et al.

It is certified that error appears in the above-identified patent and that said Letters Patent is hereby corrected as shown below:

<u>Title page,</u>
Item [73], the assignee should read:
-- [73] Assignee: Mitsubishi Jidosha Kogyo Kabushiki Kaisha, Tokyo (JP)
Kabushiki Kaisha Meiji Gomu Kasei, Tokyo (JP) --

Signed and Sealed this

Eighteenth Day of March, 2003

JAMES E. ROGAN
*Director of the United States Patent and Trademark Office*